United States Patent
Moser et al.

[11] Patent Number: 5,832,548
[45] Date of Patent: Nov. 10, 1998

[54] SNAP-IN FRAME CONNECTOR

[75] Inventors: Gregory C. Moser; Jerry R. Smith, both of Columbus, Ind.

[73] Assignee: Cosco, Inc., Columbus, Ind.

[21] Appl. No.: 914,731

[22] Filed: Aug. 19, 1997

Related U.S. Application Data

[63] Continuation of Ser. No. 590,130, Jan. 23, 1996, abandoned.

[51] Int. Cl.⁶ .................................................. A47C 19/00
[52] U.S. Cl. ................................ 5/288; 5/282.1; 5/286; 5/285
[58] Field of Search .......................... 5/201, 282.1, 286, 5/288, 285; 403/298, 273, 292, 361, 233, 263, 240, 187, 192; 108/180, 187, 193

[56] References Cited

U.S. PATENT DOCUMENTS

| | | |
|---|---|---|
| D. 36,606 | 10/1903 | Woodruff . |
| 569,235 | 10/1896 | Rockwell ................................ 403/298 |
| 911,863 | 2/1909 | Adams . |
| 960,340 | 6/1910 | Kimball . |
| 998,582 | 7/1911 | Lucas . |
| 1,070,814 | 8/1913 | Kimball . |
| 1,114,486 | 10/1914 | Kimball . |
| 1,352,594 | 9/1920 | Gail . |
| 1,486,826 | 3/1924 | Atkinson .................................. 5/282.1 |
| 3,932,048 | 1/1976 | DuPont .................................. 403/298 |
| 4,270,872 | 6/1981 | Kiyosawa ................................ 403/263 |
| 4,386,870 | 6/1983 | Baroody . |
| 4,636,106 | 1/1987 | Waisbrod ............................... 403/298 |
| 5,059,057 | 10/1991 | Graef ..................................... 403/298 |
| 5,230,581 | 7/1993 | Deng . |
| 5,426,797 | 6/1995 | Turner et al. . |

*Primary Examiner*—Kenneth J. Dorner
*Assistant Examiner*—Fredrick Conley
*Attorney, Agent, or Firm*—Barnes & Thornburg

[57] ABSTRACT

A connector is provided for use with an end-frame assembly having an outer frame and a support member. The connector includes an annular back wall having a first lateral dimension and is formed for engagement with the support member. A sleeve extends from the back wall and has a second lateral dimension that is less than the first lateral dimension. Ribs are positioned on the sleeve. In addition, the connector includes an outer end that extends away from the back wall and has a fish-mouth portion formed thereon that includes a fish-mouth opening, a leg mount that has a side wall extending through the fish-mouth opening, and a support tongue. The support tongue engages the side wall and extends through the fish-mouth portion.

32 Claims, 2 Drawing Sheets

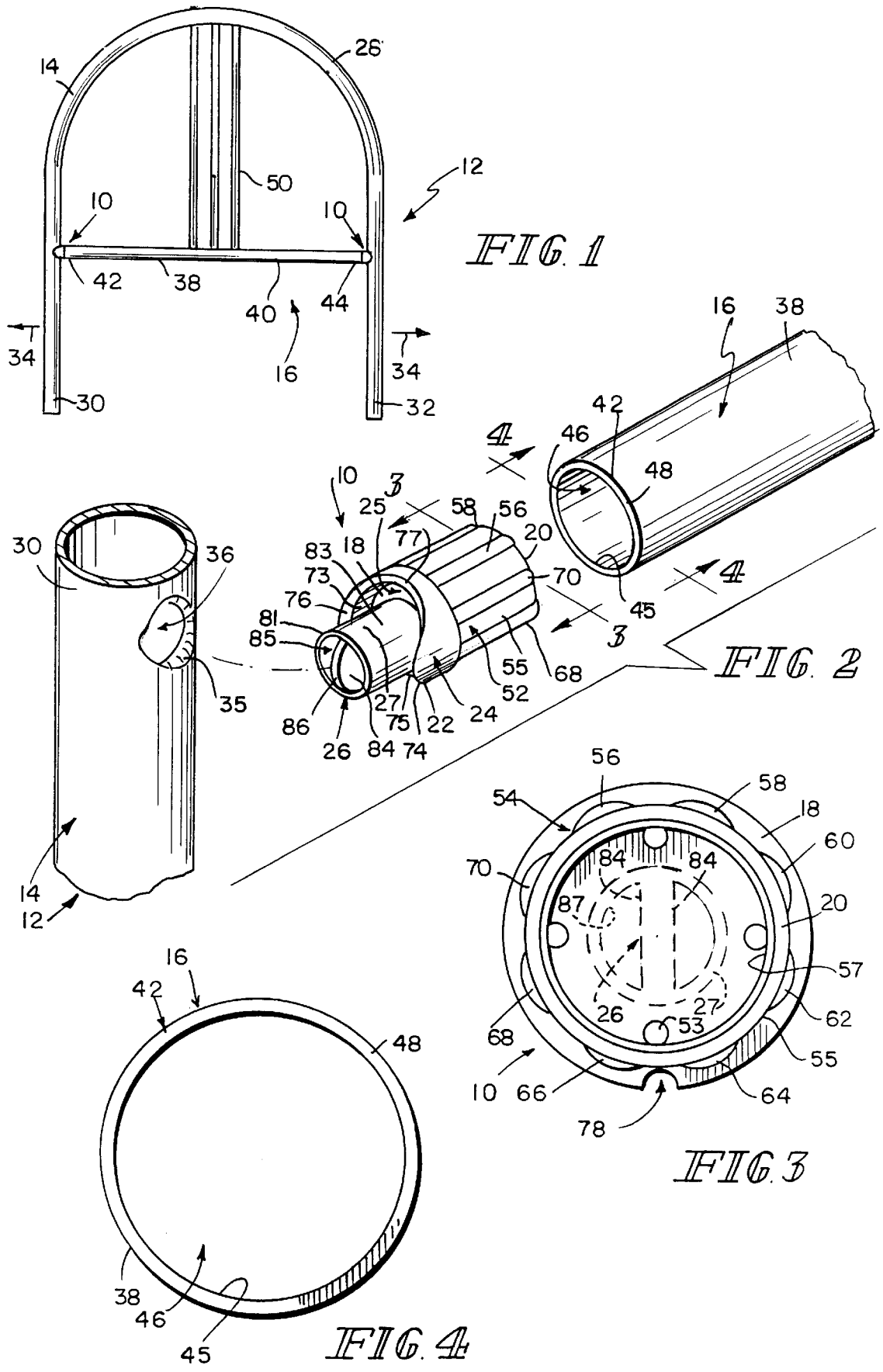

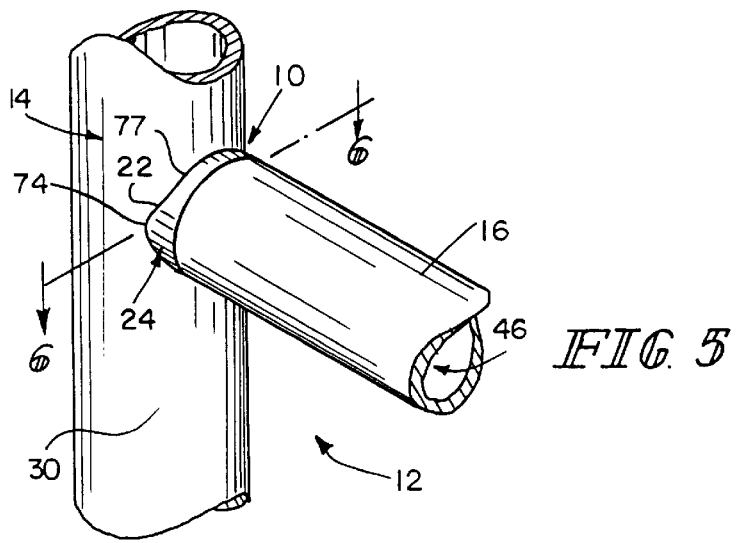
FIG. 5
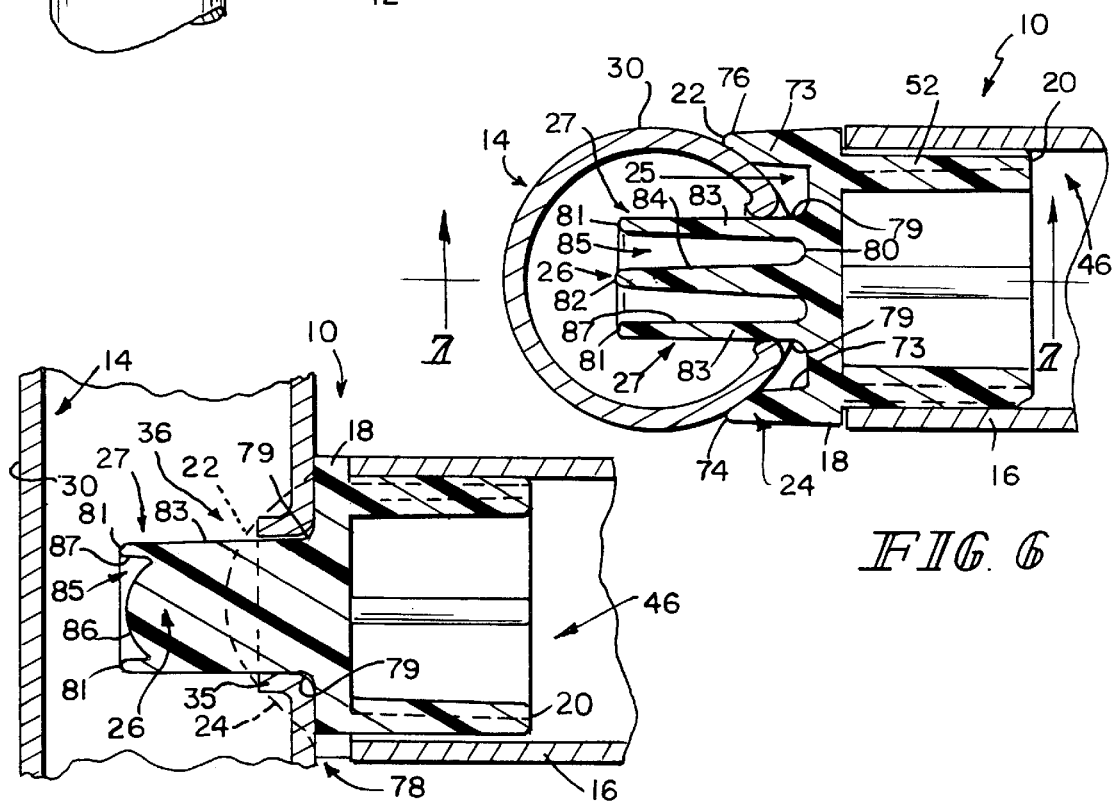
FIG. 6
FIG. 7

SNAP-IN FRAME CONNECTOR

This application is a continuation of Ser. No. 08/590,130 filed Jan. 23, 1996, now abandoned.

BACKGROUND AND SUMMARY OF THE INVENTION

The present invention relates to a connector for joining one portion of a furniture frame to another portion of the furniture frame, and particularly to a connector apparatus for use with a piece of furniture having an outer frame and a frame support member. More particularly, the present invention relates to a connector apparatus for attaching a frame support member to an outer frame to create a toddler bed end frame.

End-frame assemblies for use with such things as beds, cribs, cradles, and changing tables are known. These end frames provide structural support to the item to which the end frame is attached. In addition, the aesthetic qualities of beds, cribs, cradles, and changing tables can be enhanced by forming components of the end frames into decorative shapes and/or painting these components. One particularly pleasing end-frame assembly is a multi-colored assembly. However, lower support members of conventional metal end-frame assemblies are often welded onto the outer frame which makes multi-colored painting of end-frame assemblies difficult and expensive.

As a result, end-frame assemblies have been developed which attach the lower support member to the outer frame by connectors mechanically fastened with bolts and nuts between the outer frame and the lower support. See, for example, co-pending U.S. application Ser. No. 08/130,212 entitled "Crib Frame Assembly" for a description of such an apparatus. What is needed is a snap-on connection apparatus which is easily installed onto an end-frame assembly to connect a lower support member to an outer frame without welding or use of additional nuts and bolts.

According to the present invention, a one-piece snap-in connector apparatus is provided for use between any two portions of a multi-piece furniture frame. The snap-in connector in accordance with the present invention is particularly useful with an end-frame assembly having an outer frame formed to include an aperture therein and a lower support member formed to extend between opposite legs of the outer frame. The snap-in connector apparatus includes an inner end for attachment to the lower support member and an opposite outer end for attachment to one of the legs of the outer frame. The outer end has a fish-mouth portion formed thereon which includes side walls that define a fish-mouth opening. The outer end also includes a cylindrical-shaped leg mount that extends through the fish-mouth opening for insertion into an aperture formed in the leg of the outer frame.

The connector apparatus in accordance with the present invention is formed as a one-piece unit and is configured to mount the lower support member on the outer frame without the aid of additional fasteners and inserts. Since the connector apparatus is a one-piece snap-in unit, it is quickly installed onto the end-frame assembly, thus reducing assembly time and enabling increased production of the end frame assemblies. Moreover, once the end-frame assembly has been constructed, the one-piece connector is configured to prevent both rotational and vertical movement of the interconnected outer frame and lower support member relative to one another.

In preferred embodiments of the present invention, the one-piece connector apparatus includes a substantially flat support platform positioned between the inner and outer ends, a cylindrical wall that extends between the support platform and the inner end, and ribs positioned on the cylindrical wall. The connector is attached to the lower support member by the ribs which extend through a cylindrical cavity or passageway defined by an inner wall of the lower support member. The ribs engage the inner wall to hold the connector apparatus tightly within the lower support member. The rib and inner wall interaction allows a manufacture to obtain a secure and tight fit between a lower support member constructed of a metal and a connector constructed of a paintable plastic or glass-filled graphite matrix. Additionally, by simply adjusting the radial height of the ribs, the manufacturer is free to change the diameter of the inner wall of the lower support, depending upon the application.

To prevent rotation of the connector apparatus relative to the outer frame, the outer end of the connector apparatus preferably includes a fish-mouth portion defining opposite lips that wrap about a periphery of the outer frame when the connector apparatus is mounted on the outer frame. Further, to prevent vertical movement of the mounted connector apparatus on the outer frame, the leg of the outer frame includes a rim defining an aperture which receives the cylindrical-shaped leg mount of the connector apparatus. The vertical movement of the leg mount relative to the outer frame, once the connector apparatus is mounted on the outer frame, is thus determined by the dimensions of the rim in the outer frame defining the mount-receiving aperture. In this manner, the connector apparatus is fixed on the outer frame so that a user cannot rotate the connector apparatus on the outer frame once the connector apparatus is installed to interconnect the outer frame and the lower support member, but may only pull the leg mount out of the aperture and away from the leg to dissemble the end frame assembly.

It is a simple step to mount a lower support member on the outer frame using the snap-in connector apparatus in accordance with the present invention. An assembly worker must only extend the inner end of the connector apparatus through the cavity formed in the lower support member until the ribs are securely fitted against the inner wall of the lower support member. Preferably, the inner end is pressed into the lower support member cavity bayonet-style until the support platform of the connector apparatus rests against an open mouth formed on the lower support member to define the cavity. The user then inserts the tube-shaped leg mount on the connector apparatus into the aperture formed in the leg of the outer frame. After the assembly worker has in like manner attached a second snap-in connector apparatus on an opposite end of the lower support member, the second connector apparatus is attached to the opposite leg by gently pulling the legs of the outer frame apart to fit the leg mount of the second connector into the aperture formed in the second outer frame leg. The legs are now in a sense "spring-loaded." So, when the worker releases the legs, they spring back toward their original position to trap securely the connector apparatus between the outer member and the lower support member. The fish-mouth portion of the connector apparatus automatically nests about the periphery of the legs to create a stable support system without welding or multi-part components.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is an end elevational view of an end-frame assembly having an outer frame, a horizontally extending lower support member, and a pair of snap-on connectors in accordance with the present invention, showing the configuration of the connectors after they have been installed between the outer frame and opposite ends of the lower support member;

FIG. 2 is an exploded side elevational view of one of the snap-on connectors and a portion of the end-frame assembly of FIG. 1 showing the connector having a central support platform, an outer end having a fish-mouth portion which defines a fish-mouth opening, a cylindrical-shaped leg mount having a support tongue therein situated on the central support platform to extend through the fish-mouth opening, an opposite inner end, and circumferentially spaced-apart ribs extending axially between the central support platform and the inner end;

FIG. 3 is an end view of the connector taken along line 3—3 of FIG. 2 showing circumferentially spaced-apart positioning of the ribs about a cylindrical exterior wall of the inner end, circumferentially spaced-apart positioning of support ribs about a cylindrical interior wall of the inner end, and the relative positioning of the leg mount and tongue (in dotted lines) on the central support platform;

FIG. 4 is an end view of the lower support member taken along lines 4—4 of FIG. 2 showing the lower support member having an open mouth and a cavity or passageway extending longitudinally therethrough;

FIG. 5 is a perspective view of the snap-in connector of FIG. 1 mounted between a vertical leg in the outer frame and one end of the horizontally extending lower support member;

FIG. 6 is an enlarged cross-sectional view of the snap-in frame connector taken along line 6—6 of FIG. 5 showing the interaction of the outer frame with the leg mount and the interaction of the lower support member with the ribs; and FIG. 7 is an enlarged cross-sectional view taken along line 7—7 of FIG. 6 showing the leg mount that is received in a mount-receiving aperture formed in a downwardly extending leg of the outer frame resting upon a rim formed in the leg and located to surround the mount-receiving aperture.

DETAILED DESCRIPTION OF THE DRAWINGS

A pair of snap-in connector apparatus 10 in accordance with the present invention is shown in FIG. 1 as it would appear to a user after they have been installed in an end-frame assembly 12 having a U-shaped outer frame 14 and a straight lower support member 16. Connector apparatus 10 holds lower support member 16 securely in place without the need for welding or a multi-part connection apparatus including nuts, bolts, or the like.

Each snap-in connector apparatus 10, one of which is best shown in FIG. 2, includes a central support platform 18, an inner end 20 for attachment with lower support member 16, an opposite outer end 22 having a fish-mouth portion 24 which defines a fish-mouth opening 25, and a leg mount 27 mounted on the central support platform 18 and positioned to extend through the fish-mouth opening 25. The fish-mouth portion 24 is formed to nest automatically in a predetermined attachment position on the outer frame 14 as shown in FIGS. 1 and 5–7 so that lower support member 16 is not ajar relative to outer frame 14, but securely positioned on outer frame 14 as shown in FIG. 1. Further, fish-mouth portion 24 securely positions connector 10 on outer frame 14 so that connector 10 will be prevented from rotating relative to outer frame 14 about a longitudinal axis of connector 10.

Illustratively, connector apparatus 10 is connected to an outer frame 14 having a substantially circular cross-section. Outer frame 14 is typically constructed of metal and bent into a generally horseshoe-like shape with a predetermined radius of curvature as shown in FIG. 1. Thus, outer frame 14 includes a semicircular top portion 28 and opposite downwardly extending legs 30, 32 which provide structural support to the frame assembly 12. The legs 30, 32 and top portion 28 are generally resilient so that a user may pull the legs 30, 32 away from one another in the direction of arrows 34 to insert lower support member 16 therebetween. Upon releasing legs 30, 32, outer frame 14 springs back to trap connector apparatus 10 between lower support member 16 and said legs 30, 32. Further, as can be seen in FIG. 2, downwardly depending legs 30, 32 are formed to include a rim 35 defining a mount-receiving aperture 36 that is sized to permit extension of the leg mount 27 of the connector apparatus 10 therethrough.

Referring again to FIG. 1, each connector apparatus 10 is attached to the lower support member 16. Lower support member 16 is typically constructed from a metal and includes a cylindrical wall 38 having central portion 40 and opposite end portions 42, 44. Central portion 40 of lower support member 16 is generally linear in shape. However, it is contemplated that lower support member 16 may take a variety of forms so long as each connector 10 is securely attached thereto. Illustratively, cylindrical wall 38 of lower support member 16 includes an inner wall 45 that defines a longitudinally extending cavity or passageway 46 configured to receive one end of connector 10 as shown in FIG. 2. Additionally, lower support member 16 includes a mouth 48 positioned at each of opposite end portions 42, 44 for engagement with the central support platform 18 provided in the connector 10. Furthermore, it is contemplated that end frame assembly 12 may include one or more spindles 50 extending between central portion 40 of lower support 16 and arcuate top portion 28 of outer frame 14 as shown in FIG. 1.

Again referring to FIG. 1, the connector apparatus 10 in accordance with the present invention is designed to be fastened securely between outer frame 14 and lower support member 16. Connector apparatus 10 is typically fastened to lower support member 16 to lie in a fixed position within the cavity 46. However, it is understood that connector 10 may be attached to the lower support member 16 by a variety of attachment means which include, for example, the connector 10 gripping an outer circumference of the lower support member 16, a butt joint, or fusion. Connector apparatus 10 is preferably constructed of a paintable plastic such as polypropylene or of a glass-filled graphite matrix. However, it is understood that each connector apparatus 10 may be constructed from a wide variety of materials commonly used to construct connectors.

Illustratively, central support platform 18 of connector apparatus 10 has a substantially circular cross-section as shown in FIG. 3. Preferably, the cross-section of support platform 18 has a diameter substantially equivalent to that of the diameter of the mouth 48 (see FIG. 4) formed on the respective end portions 42, 44 of lower support member 16 in order to provide a smooth connection between lower support member 16 and outer frame 14 (see FIG. 5). Central support platform 18 is substantially flat in shape so that it lies flush with end portion 42, 44 of lower support member 16. It will be understood, however, that support platform 18 may have a variety of shapes and sizes so long as it is positioned between inner end 20 and outer end 22 of connector apparatus 10.

Referring again to FIG. 2, connector apparatus 10 further includes a cylindrical wall 52 extending between central support platform 18 and inner end 20. Illustratively, wall 52 is sized for extension into the cavity 46 formed in the lower support member 16. Illustratively, ribs 54 extend axially along an outer surface 55 of cylindrical wall 52 between central support platform 18 and inner end 20. Preferably, connector apparatus 10 includes eight ribs 56, 58, 60, 62, 64, 66, 68, and 70 positioned in uniformly spaced-apart relation to one another about the circumference of the outer surface 55 as shown in FIG. 3. Illustratively, ribs 54 engage cylindrical inner wall 45 of lower support member 16 to hold the cylindrical wall of connector apparatus 52 within the cavity 46 of lower support member 16. It is contemplated that the number and relative positioning, as well as the size of the ribs 54, may be varied so long as the ribs 54 engage the inner wall 45 of the lower support 16. Further additional ribs 53 may extend axially along an inner surface 57 of cylindrical wall 52 between central support platform 18 and inner end 20 to aid in manufacturing the connector apparatus 10.

Referring now to FIGS. 5 and 6, outer end 22 of connector apparatus 10 in accordance with the present invention illustratively has a diameter substantially equivalent to that of leg 30 of outer frame 14. Thus, fish-mouth portion 24 is formed to nest snugly about the periphery of leg 30 for engagement therewith to prevent rotation of connector 10 on outer frame 14. Additionally, fish-mouth portion 24 includes a side wall 73 defining fish-mouth opening 25. As best shown in FIG. 2, side wall 73 itself includes a pair of outwardly projecting lips 74, 76 positioned in spaced-apart relation to one another and a pair of valley portions 75, 77 positioned between lips 74, 76. The leg mount 27 extends outwardly away from central support platform 18 through fish-mouth opening 25 and between the opposite lips 74, 76. Illustratively, a notch 78 is formed through one of the valley portion 75 of the side wall 73 between the lips 74, 76 (see FIG. 7) to allow fluids which may accumulate within the connector 10 during a washing step of a paint application to drain out of the notch 78 and away from the connector apparatus 10.

Continuing to refer to FIG. 7, the leg mount 27 of connector apparatus 10 is generally tubular in shape and includes a fixed end 79 mounted on the cylindrical platform 18 and an opposite circumferential end portion 81 extending outwardly through fish-mouth opening 25. This opposite end portion 81 is formed to extend through the mount-receiving aperture 36 formed in each opposite leg 30, 32. Illustratively, the leg mount 27 includes a cylindrical wall 83 extending between the opposite end portions 79, 81 and defining a cavity 85 therein. It is contemplated however that the leg mount 27 may be formed as a solid piece and in a variety of shapes and sizes so long as the opposite end 81 extends through the fish-mount opening 25 for extension into the mount-receiving aperture 36.

It is the leg mount 27 which is positioned substantially parallel with the vertical legs 30, 32 that enables the weight of lower support 16 and any attached spindles 50 to be supported stably by leg mount 27 on rim 35 of outer member 14. Leg mount 27 rests upon rim 35 formed about the circumference of aperture 36. Thus, the diameter of rim 35 relative to diameter of cylindrical wall 83 of leg mount 27 determines the limited amount of movement of fish-mouth portion 24 on the periphery of outer frame 14. It is contemplated that the diameter of rim 35 may be varied to accommodate the insertion of various sized cylindrical wall of leg mount 27.

Illustratively a tongue 26, which is generally elliptical in shape (when received from the side) is situated within the cavity 85 to provide support for the cylindrical wall 83 of leg mount 27. The tongue 26 includes a fixed end 80 mounted on central support platform 18 and an opposite rounded free end 82 extending through the cavity 85 of the leg mount 27. It is understood that the tongue 26 may be formed in a variety of shapes sizes and include a tabbed, pointed, square, or jagged free end 82. Further, as best shown in FIG. 2, the tongue 26 includes a substantially flat side wall 84 extending between the fixed end 80 and the free end 82 and a base 86 which extends about perimeter of the side wall 84. Illustratively, side wall 84 is positioned on central support platform 18 so that it faces the opposite lips 74, 76 and the base 86 engages the side wall 83 of the leg mount 27.

In order to assemble frame apparatus 12, an assembly worker illustratively grasps central support platform 18 of connector apparatus 10 and aligns inner end 20 with the mouth 48 formed on lower support member 16. Once aligned, the user simply pushes inner end 20 into cavity 46 of lower support member 16 bayonet-style, until central support platform 18 engages and is flush with mouth 48. At this time, ribs 54 are in engagement with the inner wall 45 of the lower support member 16 and connector apparatus 10 is fastened securely on lower support member 16. Illustratively, the second connector apparatus 10 is fastened on the opposite end portion 44 in like manner to form a connector/lower support subassembly. It is further contemplated that the worker will align the connectors 10 on the lower support member 16 so that each notch 78 faces away from semicircular top portion 28 of outer frame member 14 in a downward direction.

Illustratively, to mount the connector/lower support subassembly on outer frame member 14, the worker first inserts leg mount 27 of one of the respective connectors 10 through the aperture 36 formed within leg 30. Fish-mouth portion 24 will engage leg 30, but it is understood that the first connector apparatus 10 may not be in a snug-fit position until the second connector apparatus 10 is attached to the opposite leg 32 of end frame assembly 12. To attach second connector apparatus 10, the worker gently pulls the second opposite leg 32 in the direction of arrow 34 away from leg 30 and inserts the leg mount 27 of the opposite connector apparatus 10 into the aperture 36 formed in the opposite leg 32.

It is now simple to lock connector apparatus 10 and lower support member 16 in place. The worker must simply release the legs 30, 32 of the outer frame 14. The fish-mouth portion 24 on each connector apparatus 10 automatically nests about the periphery of the respective legs 30, 32 as outer frame 14 relaxes to resume its original position.

It is easy to install a connector apparatus 10 in accordance with the present invention. The user must simply insert inner end 20 of connector apparatus 10 into lower support member 16 and insert leg mount 27 through the aperture 36 formed in the downwardly extending leg portions 30, 32 of outer frame member 14. The configuration of outer frame 14 will cause the connector 10 to be mounted securely between outer frame 14 and lower support member 16. Significantly, the one-piece connector apparatus 10 allows manufacturers to dispose of multiple component connector systems.

Although the invention has been described in detail with reference to certain preferred embodiments, variations and modifications exist within the scope and spirit of the invention as described and defined in the following claims.

What is claimed is:

1. A connector apparatus for use with an end-frame assembly having an outer frame formed to include an aperture therein and a lower support member, the apparatus comprising an inner end formed for attachment with the lower support member, an opposite outer end having a fish-mouth portion formed thereon, the fish-mouth portion being formed to include a fish-mouth opening therethrough, and a leg mount extending outwardly through the fish-mouth opening, and being formed for insertion into the aperture in the outer frame and engagement with said leg, the leg mount having a first end, an opposite second end extending through the fish-mouth opening, a substantially cylindrical side wall extending between the first and second ends and defining a cavity, and a support tongue positioned to lie within the cavity, the support tongue having a fixed end adjacent the first end and an opposite free end adjacent the second end of the cylindrical side wall.

2. The apparatus of claim 1, further comprising a support platform positioned between the inner and outer ends and the first end of the leg mount and the fixed end of the support tongue are mounted on the support platform.

3. The apparatus of claim 2, wherein the fish-mouth portion includes a fish-mouth side wall that defines the fish-mouth opening, the support platform is substantially disk-shaped and positioned to lie within the fish-mouth portion for engagement with the fish-mouth side wall, and the fixed end of the support tongue extends across the disk-shaped support platform and engages the leg mount.

4. The apparatus of claim 3, wherein the fish-mouth side wall is formed to include opposite spaced-apart lips and opposite valley portions positioned in spaced-part relation between said lips and the free end of the support tongue extends through the fish-mouth opening.

5. The apparatus of claim 1, further comprising a support platform positioned between the inner and outer ends, a cylindrical wall extending between the support platform and the inner end, and ribs positioned on the cylindrical wall.

6. The apparatus of claim 5, wherein the ribs are positioned to extend between the support platform and the inner end.

7. The apparatus of claim 5, wherein the ribs are positioned in spaced-apart relation to one another about the circumference of the wall.

8. A connection system for an end-frame assembly having an outer frame formed to include opposite legs and an aperture formed in each of the opposite legs, the system comprising a lower support member formed for attachment between said legs of the outer frame, the lower support being formed to include a central portion, and opposite end portions situated along a first axis, and a connector being attached to the lower support member at one opposite end, the connector including an inner end, an opposite outer end having a fish-mouth portion formed thereon, and a leg mount extending outwardly through the fish-mouth portion and being formed for insertion into the aperture formed within one opposite leg, the leg mount having a substantially cylindrical side wall defining a cavity and a support tongue extending through the cavity along a second axis that is substantially coincident with the first axis.

9. The system of claim 8, wherein the lower support member is formed to include a cavity therein, the inner end of the connector is mounted within the cavity, and the support tongue extends away from the inner end of the connector and engages the leg mount.

10. The system of claim 9, wherein the connector includes a support platform, a cylindrical wall extending between the support platform and the inner end, and ribs positioned on the cylindrical wall and the support tongue is mounted on the support platform and extends away from the cylindrical wall.

11. The system of claim 10, wherein the support platform engages the opposite end portion of the lower support member, the ribs extend between the support platform and the inner end and the ribs engage the central portion of the lower support.

12. The system of claim 10, wherein at least one opposite end portion of the lower support is formed to include an open mouth defining the cavity and the support platform engages the mouth.

13. The system of claim 8, wherein the connector includes a support platform positioned between the inner and outer ends and the cylindrical side wall and the support tongue are mounted on the support platform.

14. The system of claim 13, wherein the fish-mouth portion includes a side wall that defines a fish-mouth opening and has opposite spaced-apart lips and opposite valley portions positioned in spaced-apart relation between the lips and the support tongue includes a substantially flat side wall that has opposite surfaces facing the lips and a base portion extending about a perimeter of the side wall and engaging the cylindrical side wall of the leg mount.

15. An end-frame assembly comprising an outer frame having a top portion and opposite legs extending from the top portion, each leg having a rim portion formed to define an aperture extending into the leg, a lower support member being formed to include a central portion and opposite end portions, and a connector having an inner end attached to one opposite end portion of the lower support member, an opposite outer end having means for preventing rotation of the connector on the outer frame, a support platform positioned between the inner and outer ends, and a leg mount extending outwardly from the support platform and into the aperture formed within the outer frame, the leg mount having a generally cylindrical side wall defining a cavity, a first end adjacent the support platform, an opposite second end extending through the preventing means, and a support tongue including a fixed end mounted on the support platform and an opposite free end positioned to lie within the cavity adjacent the second end of the leg mount, the leg mount resting upon the rim as the preventing means engages an outer periphery of the outer frame to affix the lower support member on the outer frame.

16. The end-frame assembly of claim 15, wherein the connector includes a cylindrical wall extending between the support platform and the inner end, ribs are positioned on the cylindrical wall, and the support tongue extends away from the cylindrical wall of the connector.

17. The end-frame assembly of claim 16, wherein the lower support member includes an open mouth defining a cavity therethrough, the cylindrical wall is positioned within the cavity so that the ribs engage the lower support member, and the support platform engages the open mouth to form a smooth connection between the connector and the lower support member.

18. The end-frame assembly of claim 15, wherein the preventing means is a fish-mouth portion positioned to lie at the outer end, the fish-mouth portion includes a side wall forming a pair of outwardly projecting lips and a fish-mouth opening between said lips, the leg mount of the support means extends through the fish-mouth opening, the support tongue includes a substantially flat side wall that extends between the fixed end and the free end, and the flat side wall has opposite surfaces facing the outwardly projecting lips.

19. The end-frame assembly of claim 15, wherein the legs are situated in a substantially vertical position, the lower support member is situated in a substantially horizontal position relative to the opposite legs, the support tongue and the cylindrical side wall of the leg mount extend substantially perpendicular to the vertical legs of the outer frame.

20. The end-frame assembly of claim 19, wherein the first end of the leg mount is mounted on the support platform and the second opposite end extends outwardly from the support platform.

21. A connector system comprising
   a support member made of a metal material and being formed to include a central portion and opposite end portions situated along a first axis, at least one end portion having a cavity therein, and
   a unitary frame connector made of a plastics material and including an inner end extending into the cavity, means for forming a tight fit between the inner end and the metal support member, an opposite outer end having a fish-mouth portion formed thereon, the fish-mouth portion being formed to include a fish-mouth opening therethrough, and a leg mount extending through the fish-mouth opening, the leg mount including a cylindrically-shaped side wall having opposite ends and defining a cavity between the opposite ends and a substantially flat support tongue extending through the cavity along a second axis that is substantially coincident with the first axis between the opposite ends of the cylindrically-shaped side wall.

22. The connector system of claim 21, wherein the fish-mouth portion includes opposite spaced-apart lips and opposite valley portions positioned in spaced-apart relation between the lips and the support tongue includes a substantially flat side wall having opposite surfaces facing the spaced-apart lips of the fish-mouth portion.

23. The connector system of claim 22, wherein the frame connector includes a support platform positioned between the inner end and the outer end and the cylindrically-shaped side wall and the support tongue of the leg mount extend away from the support platform.

24. The connector system of claim 23, wherein the support tongue of the leg mount includes a fixed end mounted on the support platform and an opposite free end extending away from the fish-mouth opening.

25. The connector system of claim 24, wherein the cylindrically-shaped side wall includes a first end adjacent the support platform and an opposite second end extending away from the fish-mouth opening, and the free end of the support tongue is positioned to lie adjacent the second end of the cylindrically-shaped side wall.

26. A connector apparatus for use with an end-frame assembly having an outer frame formed to include an aperture therein and a support member having opposite ends, the apparatus comprising
   an annular back wall having a first lateral dimension and being formed for engagement with one of the opposite ends of the support member,
   a sleeve extending from the annular back wall and having a second-lateral dimension that is less than the first lateral dimension of the annular back wall,
   ribs being positioned on the sleeve,
   an outer end extending away from the annular back wall and having a fish-mouth portion formed thereon, the fish-mouth portion being formed to include a fish-mouth opening therethrough,
   a leg mount having a side wall extending through the fish-mouth opening, and
   a support tongue engaging the side wall and extending through the fish-mouth portion.

27. The apparatus of claim 26, wherein the side wall of the leg mount defines a cavity and the support tongue is positioned to lie in the cavity and extends away from the sleeve substantially parallel the side wall.

28. The apparatus of claim 26, further comprising an annular ring extending from the annular back wall, and the fish-mouth portion and the support tongue are mounted on the annular ring.

29. The apparatus of claim 28, wherein the annular ring has a diameter that is substantially equivalent to the first lateral dimension.

30. The apparatus of claim 28, wherein the leg mount has a first end mounted on the annular ring and an opposite second end extending through the fish-mouth opening, the side wall extends between the first and second ends and the support tongue extends across the cavity and engages the side wall.

31. The apparatus of claim 26, wherein the fish-mouth portion has a lateral dimension that is substantially equivalent to the first lateral dimension.

32. A connector apparatus for use with an end-frame assembly having an outer frame formed to include an aperture therein and a support member having opposite ends, the apparatus comprising
   an annular back wall having a first lateral dimension and being formed for engagement with one of the opposite ends of the support member,
   an annular ring extending from the annular back wall,
   a sleeve extending from the annular back wall and having a second lateral dimension that is less than the first lateral dimension of the annular back wall,
   ribs being positioned on the sleeve,
   an outer end extending away from the annular back wall and having a fish-mouth portion formed thereon, the fish-mouth portion being mounted on the annular ring and formed to include a fish-mouth opening therethrough, and
   a leg mount having a first end mounted on the annular ring and an opposite second end extending through the fish-mouth opening, a side wall extending through the fish-mouth opening between the first and second ends, and
   a support tongue having a fixed end mounted on the annular ring, an opposite free end, and a substantially flat side wall extending between the fixed and free ends, the support tongue extending across the cavity and engaging the side wall.

* * * * *